US012606162B2

(12) United States Patent
Lee et al.

(10) Patent No.: US 12,606,162 B2
(45) Date of Patent: Apr. 21, 2026

(54) VEHICLE AND METHOD OF CONTROLLING THE SAME

(71) Applicants:HYUNDAI MOTOR COMPANY, Seoul (KR); KIA CORPORATION, Seoul (KR); HL KLEMOVE CORP., Incheon (KR)

(72) Inventors: Sangmin Lee, Seoul (KR); Dong Hyun Sung, Hwaseong-si (KR); Yongseok Kwon, Suwon-si (KR); Tae-Geun An, Yeongju-si (KR); Eungseo Kim, Gwacheon-si (KR); Junghyun Kim, Seoul (KR); Jin Hyeon Park, Osan-si (KR); Wonsik Jung, Seongnam-si (KR)

(73) Assignees: Hyundai Motor Company, Seoul (KR); Kia Corporation, Seoul (KR); HL Klemove Corporation, Incheon (KR)

( * ) Notice: Subject to any disclaimer, the term of this patent is extended or adjusted under 35 U.S.C. 154(b) by 223 days.

(21) Appl. No.: 17/518,993

(22) Filed: Nov. 4, 2021

(65) Prior Publication Data

US 2022/0203974 A1 Jun. 30, 2022

(30) Foreign Application Priority Data

Dec. 24, 2020 (KR) ........................ 10-2020-0183941

(51) Int. Cl.
*B60W 30/095* (2012.01)
*B60W 30/09* (2012.01)
*B60W 40/105* (2012.01)

(52) U.S. Cl.
CPC ........ *B60W 30/0956* (2013.01); *B60W 30/09* (2013.01); *B60W 40/105* (2013.01);
(Continued)

(58) Field of Classification Search
None
See application file for complete search history.

(56) References Cited

U.S. PATENT DOCUMENTS 9,150,199 B2 * 10/2015 Schleicher .......... B60W 10/184
9,834,211 B2 * 12/2017 Kida ..................... B60W 10/18
(Continued)

FOREIGN PATENT DOCUMENTS

CN 105539586 A 5/2016
CN 111417554 A 7/2020
(Continued)

OTHER PUBLICATIONS

Office Action dated Jun. 26, 2025, issued for the corresponding Chinese patent application 202111403202.7.

*Primary Examiner* — Navid Z. Mehdizadeh
*Assistant Examiner* — Oliver Tan
(74) *Attorney, Agent, or Firm* — Morgan, Lewis & Bockius LLP

(57) ABSTRACT

A vehicle for performing avoidance control of the vehicle according to a position and a relative speed of an object, may include a sensing device mounted to the vehicle and having a field of view in front of the vehicle and a field of view in a lateral side of the vehicle, the sensing device configured to obtain object data related to the object; a dynamics sensor configured to detect a motion of the vehicle and obtain motion data based on the motion of the vehicle; and a controller including a processor configured to process the object data and the motion data.

20 Claims, 8 Drawing Sheets

(52) U.S. Cl.
 CPC . *B60W 2520/06* (2013.01); *B60W 2554/4041*
  (2020.02); *B60W 2554/80* (2020.02)

(56)      References Cited

U.S. PATENT DOCUMENTS

| | | | | |
|---|---|---|---|---|
| 10,580,303 | B2 * | 3/2020 | Morotomi | G08G 1/165 |
| 10,907,962 | B2 * | 2/2021 | Omachi | B60W 30/00 |
| 2012/0226423 | A1 * | 9/2012 | Sekiguchi | G08G 1/166 |
| | | | | 701/70 |
| 2014/0163859 | A1 * | 6/2014 | Tsuchida | G01S 13/72 |
| | | | | 701/301 |
| 2018/0144635 | A1 * | 5/2018 | Jeon | G08G 1/166 |
| 2018/0268702 | A1 | 9/2018 | Morotomi et al. | |
| 2018/0339670 | A1 * | 11/2018 | Nishimura | B60W 10/20 |
| 2018/0361973 | A1 * | 12/2018 | Harada | B60R 21/0134 |
| 2019/0299982 | A1 * | 10/2019 | Guechai | B60W 10/20 |
| 2021/0031762 | A1 * | 2/2021 | Matsunaga | B60W 50/14 |

FOREIGN PATENT DOCUMENTS

| | | | | |
|---|---|---|---|---|
| JP | 2019-188936 | A | | 10/2019 |
| KR | 20140060107 | A | * | 11/2012 |
| KR | 102368598 | B1 | * | 4/2017 |
| KR | 10-2018-0065585 | A | | 6/2018 |
| KR | 10-2018-0066524 | A | | 6/2018 |
| KR | 10-2018-0136229 | A | | 12/2018 |

* cited by examiner

VEHICLE AND METHOD OF CONTROLLING THE SAME

CROSS-REFERENCE TO RELATED APPLICATION(S)

The present application claims priority to Korean Patent Application No. 10-2020-0183941, filed on Dec. 24, 2020, the entire contents of which is incorporated herein for all purposes by this reference.

BACKGROUND OF THE INVENTION

Field of the Invention

The present invention relates to a vehicle and a method of controlling the vehicle, and more particularly, to a driver assistance system.

Description of Related Art

Advanced driver assistance systems (ADASs) utilize various sensors such as cameras and radars mounted on a vehicle to determine a possibility of collision with pedestrians or other vehicles, and automatically control braking devices and steering devices based on this to avoid collision accidents in advance.

Among the ADASs, Forward Collision Avoidance Assist (FCA) warns a driver of danger and forcibly controls a braking or a steering of the vehicle to prevent a collision with a front obstacle while driving.

For such collision avoidance assistance, although the vehicle determines the possibility of collision by considering only a physical distance and a relative speed with respect to the front obstacle, avoidance control is performed even when there is no an actual collision possibility, providing an unnatural driving feeling to a driver.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle that prevents a sensitive control of collision avoidance assistance and performs avoidance control only when there is an actual collision possibility, and a method of controlling the vehicle.

Additional aspects of the present invention will be set forth in part in the description which follows, and in part, will be obvious from the description, or may be learned by practice of the present invention.

According to various aspects of the present invention, there is provided a vehicle for performing avoidance control of the vehicle based on a position and a relative speed of an object. The vehicle including: a sensing device mounted to the vehicle and having a field of view in front of the vehicle and a field of view in a lateral side of the vehicle, the sensing device configured to obtain object data related to the object; a sensor configured to detect a motion of the vehicle and obtain motion data based on the motion of the vehicle; and a controller including a processor configured to process the object data and the motion data. The controller may be configured to: determine a heading angle between the object and the vehicle according to the object data and the motion data, a lateral position of the object with respect to the vehicle, and an amount of turning of the vehicle, and not perform the avoidance control of the vehicle based on the heading angle, the lateral position, and the amount of turning being greater than or equal to a predetermined threshold value.

The controller may be configured to: when the heading angle is greater than or equal to a predetermined first threshold value, determine a first index corresponding to the heading angle as 1, when the heading angle is less than the predetermined first threshold value, determine the first index as 0, when the lateral position is greater than or equal to a predetermined second threshold value, determine a second index corresponding to the lateral position as 1, when the lateral position is less than the predetermined second threshold value, determine the second index as 0, when the amount of turning is greater than or equal to a predetermined third threshold value, determine a third index corresponding to the amount of turning as 1, and when the amount of turning is less than the predetermined third threshold value, determine the third index as 0.

Based on at least one of the first index, the second index, and the third index having a value of 1, the controller may be configured not to perform the avoidance control.

The controller may be configured to: determine a change amount per time of the heading angle, when the change amount per time of the heading angle is greater than or equal to a predetermined change amount threshold value, determine a first index corresponding to the change amount per time of the heading angle as 1, and when the change amount per time of the heading angle is less than the predetermined change amount threshold value, determine the first index as 0.

The heading angle may be an angle between an extension line perpendicular to a front surface of the vehicle and an extension line perpendicular to a front surface of the object.

The controller may be configured to form a band having a constant width based on the vehicle, to determine a second index corresponding to the lateral position as 1 based on the detection of the object outside the band, and to determine the second index as 0 based on the detection of the object within the band.

The controller may be configured to determine the amount of turning based on a steering angle of the vehicle, a speed of the vehicle, and an angular speed of the vehicle.

According to various aspects of the present invention, there is provided a method of controlling a vehicle, the vehicle the vehicle for performing avoidance control of the vehicle based on a position and a relative speed of an object. The method including: obtaining, by sensors, object data and motion data; determining, by a controller, a heading angle between the object and the vehicle according to the object data and the motion data, a lateral position of the object with respect to the vehicle, and an amount of turning of the vehicle; and controlling, by the controller, the vehicle not to perform the avoidance control of the vehicle based on the heading angle, the lateral position, and the amount of turning being greater than or equal to a predetermined threshold value.

The determining may include, when the heading angle is greater than or equal to a predetermined first threshold value, determining a first index corresponding to the heading angle as 1; when the heading angle is less than the predetermined first threshold value, determining the first index as 0; when the lateral position is greater than or equal to a predetermined second threshold value, determining a second index corresponding to the lateral position as 1; when the lateral position is less than the predetermined second threshold value, determining the second index as 0; when the amount of turning is greater than or equal to a predetermined third threshold value, determining a third index corresponding to the amount of turning as 1; and when the amount of turning is less than the predetermined third threshold value, determining the third index as 0.

The controlling of the vehicle may include, when at least one of the first index, the second index, and the third index has a value of 1, controlling the vehicle not to perform the avoidance control.

The determining may include, determining a change amount per time of the heading angle; when the change amount per time of the heading angle is greater than or equal to a predetermined change amount threshold value, determining a first index corresponding to the change amount per time of the heading angle as 1; and when the change amount per time of the heading angle is less than the predetermined change amount threshold value, determining the first index as 0.

The heading angle may be an angle between an extension line perpendicular to a front surface of the vehicle and an extension line perpendicular to a front surface of the object.

The determining may include, forming a band having a constant width based on the vehicle; when the object is detected to be outside the band, determining a second index corresponding to the lateral position as 1; and when the object is detected to be within the band, determining the second index as 0.

The determining may include determining the amount of turning based on a steering angle of the vehicle, a speed of the vehicle, and an angular velocity of the vehicle.

According to various aspects of the present invention, there is provided a non-transitory computer readable medium including program instructions executed by a processor. The computer readable medium including: program instructions that obtain, by sensors, object data and motion data; program instructions that determine, by a controller, a heading angle between the object and the vehicle according to the object data and the motion data, a lateral position of the object with respect to the vehicle, and an amount of turning of the vehicle; and program instructions that control, by the controller, the vehicle not to perform the avoidance control of the vehicle based on the heading angle, the lateral position, and the amount of turning being greater than or equal to a predetermined threshold value.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

These and/or other aspects of the present invention will become apparent and more readily appreciated from the following description of the embodiments, taken in conjunction with the accompanying drawings of which.

Figure 1:
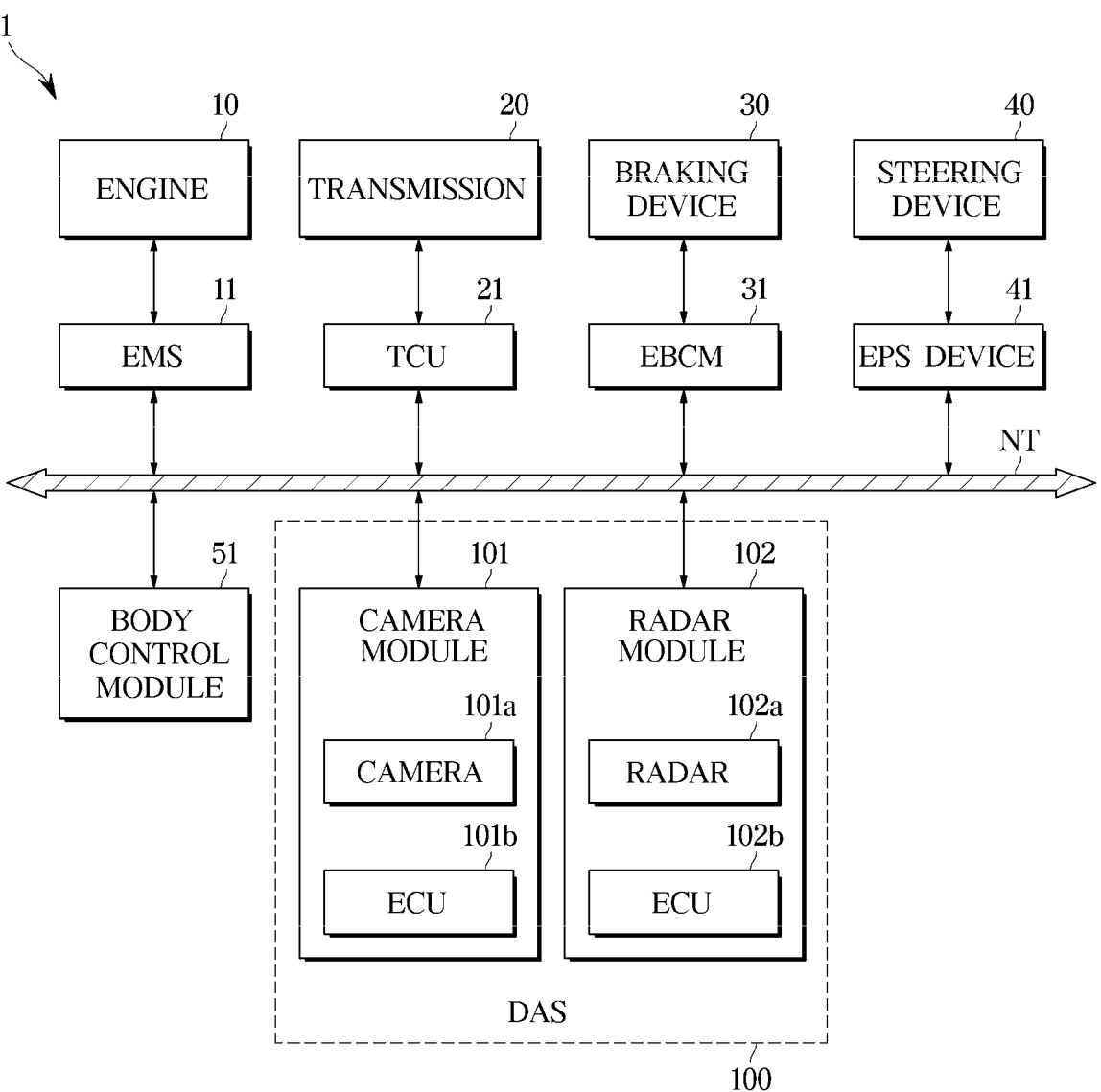
FIG. 1 is a view exemplarily illustrating a configuration of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. Not all elements of the embodiments of the present invention will be described, and the description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or including)" are inclusive or open-ended and do not exclude additional, unrecited elements or method steps, unless otherwise mentioned.

Throughout the specification, when a member is located "on" another member, this includes not only when one member is in contact with another member but also when another member exists between the two members.

It will be understood that, although the terms first, second, third, etc., may be used herein to describe various elements, components, regions, layers and/or sections, these elements, components, regions, layers and/or sections may not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, operation principles and embodiments of the present invention will be described with reference to accompanying drawings.

Figure 2:
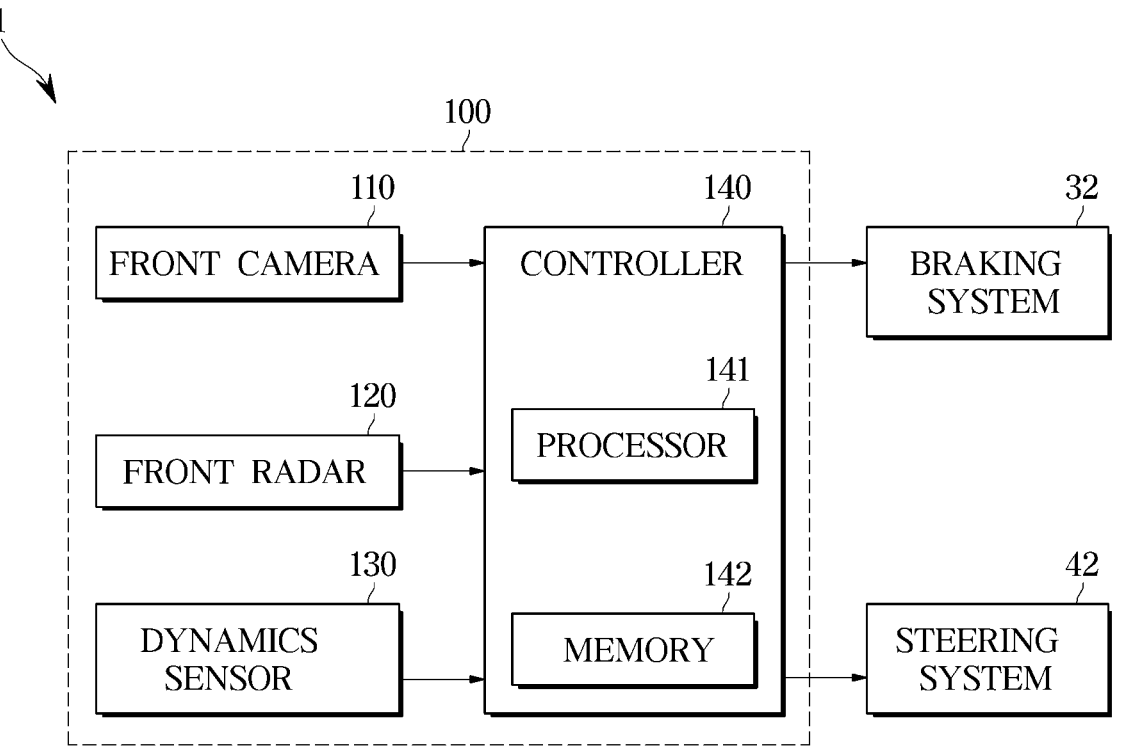
FIG. 2 is a control block diagram of a vehicle according to an exemplary embodiment of the present invention.
Figure 3:
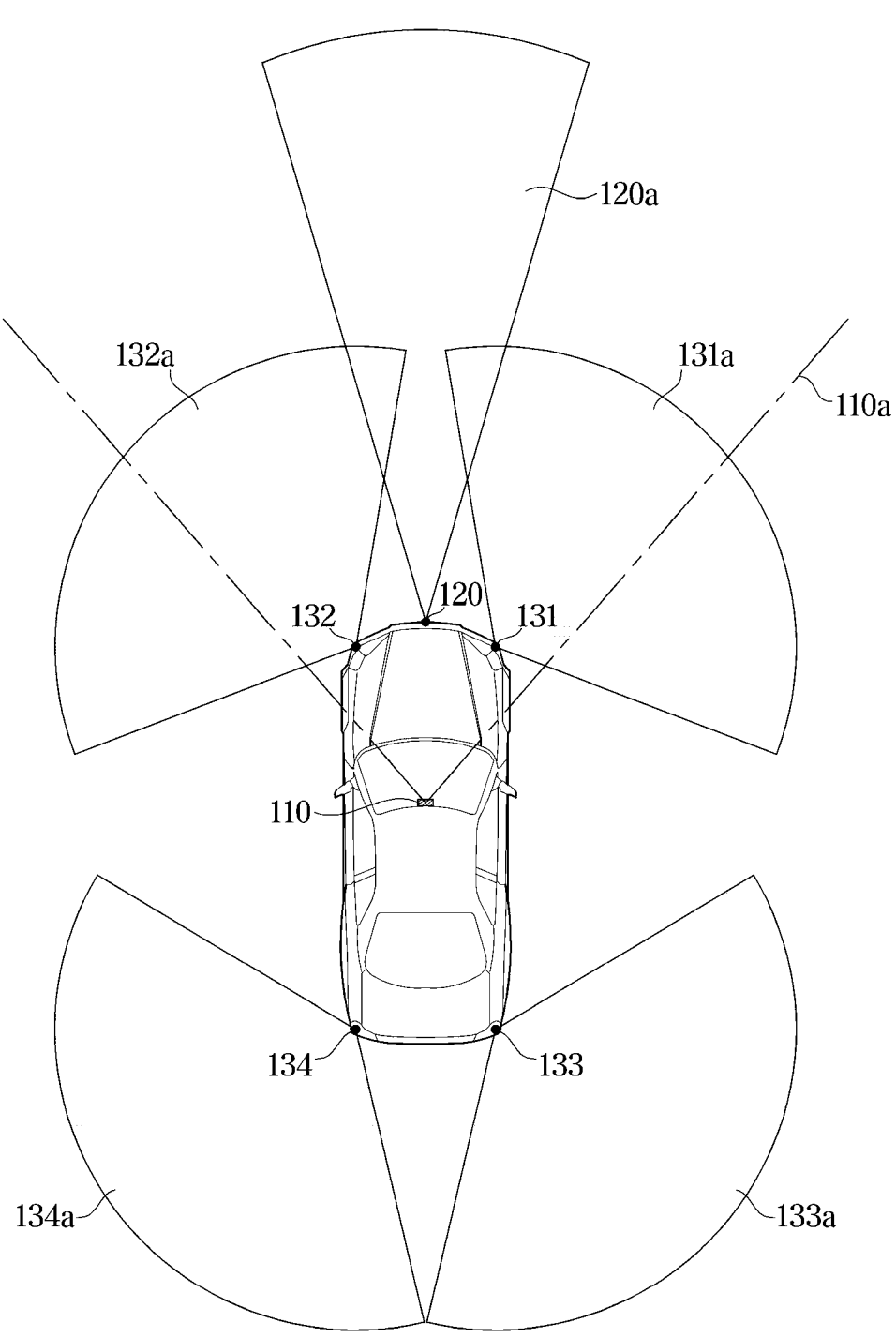
FIG. 3 is a view exemplarily illustrating a camera and a radar included in a driver assistance system (DAS) according to an exemplary embodiment of the present invention.

FIG. 1 is a view exemplarily illustrating a configuration of a vehicle according to various exemplary embodiments of the present invention, FIG. 2 is a control block diagram of a vehicle according to various exemplary embodiments of the present invention, and FIG. 3 is a view exemplarily illustrating a camera and a radar included in a driver assistance system (DAS) according to an exemplary embodiment of the present invention.

As illustrated in FIG. 1, a vehicle 1 may include an engine 10, a transmission 20, a braking device 30, and a steering device 40. The engine 10 may include at least one cylinder and at least one piston, and may generate power needed to drive the vehicle 1. The transmission 20 may include a plurality of gears, and may transmit power generated by the engine 10 to wheels of the vehicle 1. The braking device 30 may decelerate or stop the vehicle 1 through frictional force on wheels. The braking device 30 may include one or more brake pads and brake shoes operative to decelerate or stop the vehicle. The steering device 40 may change a driving direction of the vehicle 1.

The vehicle 1 may include a plurality of electronic constituent elements. For example, the vehicle 1 may further include an Engine Management System (EMS) 11, a Transmission Controller also referred to as a Transmission Controller also referred to as a Transmission Control Unit (TCU) 21, an Electronic Brake Controller also referred to as an Electronic Brake Control Module (EBCM) 31, an Electronic Power Steering (EPS) device 41, a Body Control Module (BCM), and a driver assistance system (DAS) 100.

The EMS 11 may control the engine 10 in a response to either the driver's acceleration intention from the accelerator pedal or a request signal from the DAS 100. For example, the EMS 11 may control torque of the engine 10.

The TCU 21 may control the transmission 20 in a response to either a driver's gearshifting command activated by a gearshifting lever and/or a driving speed of the vehicle 1. For example, the TCU 21 may adjust or regulate a gearshifting ratio from the engine 10 to wheels of the vehicle 1.

The EBCM 31 may control a braking device 30 in a response to either the driver's brake intention from a brake pedal or slippage of wheels. For example, the EBCM 31 may temporarily release wheel braking in a response to wheel slippage detected in a braking mode of the vehicle 1, resulting in implementation of an Anti-lock Braking System (ABS). The EBCM 31 may selectively release braking of wheels in a response to oversteering and/or understeering detected in a steering mode of the vehicle 1, resulting in implantation of Electronic Stability Control (ESC). Furthermore, the EBCM 31 may temporarily brake wheels in a response to wheel slippage detected by vehicle driving, resulting in implementation of a Traction Control System (TCS).

The EPS device 41 may assist the steering device 40 in a response to the driver's steering intention from a steering wheel such that the EPS device 41 may assist the driver in easily handling the steering wheel. For example, the EPS device 41 may assist the steering wheel such that steering force decreases in a low-speed driving mode or a parking mode of the vehicle 1 but increases in a high-speed driving mode of the vehicle 1.

A body control module 51 may control various electronic components that are configured for providing the driver with user convenience or guaranteeing driver safety. For example, the body control module 51 may control headlamps (headlights), wipers, an instrument or other cluster, a multifunctional switch, turn signal indicators, or the like.

The DAS 100 may assist the driver in easily handling (e.g., driving, braking, and steering) the vehicle 1. For example, the DAS 100 may detect peripheral environments (e.g., a peripheral vehicle, a pedestrian, a cyclist, a lane, a traffic sign, or the like) of the vehicle 1 (i.e., vehicle itself), and may perform driving, braking, and/or steering of the vehicle 1 in a response to the detected peripheral environments.

The DAS 100 may provide the driver with various functions. For example, the DAS 100 may provide the driver with a Lane Departure Warning (LDW) function, a Lane Keeping Assist (LKA) function, a High Beam Assist (HBA) function, an Autonomous Emergency Braking (AEB) function, a Traffic Sign Recognition (TSR) function, a Smart Cruise Control (SCC) function, a Blind Spot Detection (BSD) function, or the like.

The DAS 100 may include a camera module 101 operative to obtain image data of a peripheral area of the vehicle 1 (e.g., an area outside of and surrounding the vehicle 1), and a radar module 102 operative to obtain data about a peripheral object present in the peripheral area of the vehicle 1. The camera module 101 may include a camera 101a or a plurality of cameras and an Electronic Control Unit (ECU) 101b. The camera 101a may capture an image including a forward area of the vehicle 1 (e.g., an area in front of the vehicle 1), and may include an image processor operative to process the captured image to recognize peripheral vehicles, pedestrians, cyclists, lanes, traffic signs, or the like in the captured image. The radar module 102 may include a radar 102a or a plurality of radars and an ECU 102b, and may obtain or determine a relative position, a relative speed, or the like of the peripheral object (e.g., a peripheral vehicle, a pedestrian, or a cyclist) of the vehicle 1 based on detected radar data.

The DAS 100 is not limited to the components illustrated in FIG. 1, and may further include a Light Detection And Ranging (LiDAR) that scans around the vehicle 1 and detects the object.

The above-mentioned electronic components may communicate with each other through a vehicle communication network (NT). For example, the electronic components may perform data communication through Ethernet, Media Oriented Systems Transport (MOST), a FlexRay, a Controller Area Network (CAN), a Local Interconnect Network (LIN), or the like. For example, the DAS 100 may respectively transmit a drive control signal, a brake signal, and a steering signal to the EMS 11, the EBCM 31, and the EPS device 41 over the vehicle communication network (NT).

Referring to FIG. 2, the vehicle 1 may include a braking system 32, a steering system 42, and the DAS 100.

As described above, the vehicle 1 may perform avoidance control based on the position and the relative speed of the object according to the DAS 100 that performs forward collision avoidance assist (FCA). Here, the object may refer to another vehicle, the pedestrian, the cyclist, and the like, and may refer to all objects to be avoided by the driving vehicle 1.

The braking system 32 according to the exemplary embodiment may include the EBCM 31 (see FIG. 1) and the braking device 30 (see FIG. 1) described in conjunction with FIG. 1, and the steering system 42 may include the EPS 41 (see FIG. 1) and the steering device 40 (see FIG. 1).

The DAS 100 may include a front camera 110 a front radar 120, and a plurality of corner radars. The front camera 110, the front radar 120, and the plurality of corner radars are sensors for detecting the object outside the vehicle 1, and may be collectively referred to as a sensing device.

The sensing device may detect the object, obtain object data, and provide it to the controller 140. In the instant case, the object data may include image data obtained from the front camera 110, and radar data obtained from the front radar 120 and/or the corner radars.

Referring to FIG. 3, the front camera 110 may have a field of view 110a directed to the front of the vehicle 1. The front camera 110 may be provided, for example, on a front windshield of the vehicle 1.

The front camera 110 may capture image of the front of the vehicle 1 and obtain image data regarding the front of the vehicle 1. The image data regarding the front of the vehicle 1 may include position information related to at least one of other vehicles, pedestrians, cyclists, lanes, curbs, guardrails, street trees, and streetlights located in front of the vehicle 1.

The front camera 110 may image the front of the vehicle 1 and obtain image data regarding the front of the vehicle 1. The image data regarding the front of the vehicle 1 may include a position with respect to other vehicles or signs or pedestrians or cyclists or lanes located in front of the vehicle 1.

The front camera 110 may include a plurality of lenses and an image sensor. The image sensor may include a plurality of photodiodes for converting light into electrical signals, and the plurality of photodiodes may be disposed in a two-dimensional matrix.

The front camera 110 may be electrically connected to a controller 140. For example, the front camera 110 may be connected to the controller 140 through the vehicle communication network NT, through a hard wire, or through a printed circuit board (PCB).

The front camera 110 may transmit the image data regarding the front of the vehicle 1 to the controller 140.

The front radar 120 may have a field of sensing 120a directed to the front of the vehicle 1. The front radar 120 may be provided, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle. The front radar 120 may obtain front radar data from the transmission radio waves transmitted by the transmission antenna and the reflection radio waves received by the reception antenna. The front radar data may include position information and velocity information regarding an obstacle, such as other vehicles, pedestrians, or cyclists existing in front of the vehicle 1. The front radar 120 may determine the relative distance to the obstacle based on the phase difference (or time difference) between the transmission radio waves and the reflection radio waves, and determine the relative speed of the object based on the frequency difference between the transmission radio waves and the reflected radio waves.

The front radar 120 may be connected to the controller 140 through the vehicle communication network NT, the hard wire, or the PCB. The front radar 120 may transmit the front radar data to the controller 140.

A dynamics sensor 130 may detect a motion of the vehicle 1 and obtain motion data based on the motion of the vehicle 1. The motion data may include information related to the driving speed, a steering angle, and a yaw rate of the vehicle 1. The dynamics sensor 130 is a variety of well-known sensors such as a wheel speed sensor, a steering angle sensor, and a yaw rate sensor, and may be disposed at an appropriate position such as the wheel and the steering wheel of the vehicle 1 to detect the driving speed, the steering angle, the yaw rate, etc. of the vehicle 1 and transmit it to the controller 140.

The plurality of corner radars may include a first corner radar 131 mounted to a forward right side of the vehicle 1, a second corner radar 132 mounted to a forward left side of the vehicle 1, a third corner radar 133 mounted to a rear right side of the vehicle 1, and a fourth corner radar 134 mounted to a rear left side of the vehicle 1.

As illustrated in FIG. 3, the first corner radar 131 may include a field of sensing (FOS) 131a oriented to a forward right area of the vehicle 1. For example, the forward-view radar 120 may be mounted to a right side of a front bumper of the vehicle 1. The second corner radar 132 may include an FOS 132a oriented to a forward left area of the vehicle 1, and may be mounted to, for example, a left side of the front bumper of the vehicle 1. The third corner radar 133 may include an FOS 133a oriented to a rear right area of the vehicle 1, and may be mounted to, for example, a right side of a rear bumper of the vehicle 1. The fourth corner radar 134 may include an FOS 134a oriented to a rear left area of the vehicle 1, and may be mounted to, for example, a left side of the rear bumper of the vehicle 1.

Each of the first, second, third, and fourth radars 131, 132, 133, and 134 may include a transmission (Tx) antenna and a reception (Rx) antenna. The first, second, third, and fourth corner radars 131, 132, 133, and 134 may respectively obtain first corner radar data, second corner radar data, third corner radar data, and fourth corner radar data. The first corner radar data may include information related to a distance between the vehicle 1 and the object (e.g., other vehicles, pedestrians, or cyclists) present in a forward right area of the vehicle 1, and information related to a speed of the object. The second corner radar data may include information related to a distance between the vehicle 1 and an object (e.g., other vehicles, pedestrians, or cyclists) present in a forward left area of the vehicle 1, and information related to a speed of the object. The third corner radar data may include information related to a distance between the vehicle 1 and an object (e.g., other vehicles, pedestrians, or cyclists) present in a rear right area of the vehicle 1, and information related to a speed of the object. The fourth corner radar data may include information related to a distance between the vehicle 1 and an object (e.g., other vehicles, pedestrians, or cyclists) present in a rear left area of the vehicle 1, and information related to a speed of the object.

Each of the first, second, third, and fourth corner radars 131, 132, 133, and 134 may be connected to the controller 140 through, for example, the vehicle communication network NT, the hard wire, or the PCB. The first, second, third, and fourth corner radars 131, 132, 133, and 134 may respectively transmit first corner radar data, second corner radar data, third corner radar data, and fourth corner radar data to the controller 140.

The controller 140 may include the ECU 101b (see FIG. 1) of the camera module 101 (see FIG. 1) and/or the ECU 102b (see FIG. 1) of the radar module 102 (see FIG. 1), and/or an integrated ECU.

The controller 140 includes a processor 141 and a memory 142.

The processor 141 may process front image data of the front camera 110, the front radar data of the front radar 120, and the corner radar data of the plurality of corner radars, and may generate a braking signal and the steering signal for controlling the braking system 32 and the steering system 42.

For example, the processor 141 may include an image signal processor for processing the front image data of the front camera 110 and/or a digital signal processor for processing the radar data of the radars 120 and/or a micro control unit (Micro Control Unit, MCU) for generating the braking signal and the steering signal.

The processor 141 may detect the objects (for example, other vehicles, pedestrians, cyclists, etc.) in front of the vehicle 1 based on the front image data of the front camera 110 and the front radar data of the front radar 120.

The processor 141 may obtain a position (distance and direction) and a relative speed of the objects in front of the vehicle 1 based on the front radar data of the front radar 120. The processor 141 may obtain the position (direction) and type information (e.g., whether the object is another vehicle or the pedestrian, or the cyclist, etc.) of the objects in front of the vehicle 1 based on the front image data of the front camera 110.

Furthermore, the processor 141 may match the objects detected by the front image data to the objects detected by the front radar data, and obtain the type information, the position, and the relative speed of the objects in front of the vehicle 1 based on a result of the matching.

The processor 141 may generate the braking signal and the steering signal based on the type information, the position, and the relative speed of front objects.

For example, the processor 141 determines a time to collision (TTC) between the vehicle 1 and the front object based on the position (distance) and the relative speed of the front objects, and warns the driver of a collision, transmits the braking signal to the braking system 32, or transmits the steering signal to the steering system 42 based on a result of comparing the TTC with a predetermined reference time.

As various exemplary embodiments of the present invention, the processor 141 may determine a distance to collision (DTC) based on the relative speed of front objects, and warn the driver of a collision or transmit the braking signal to the braking system 32 or transmit the braking signal to the steering system 42 based on a result of comparing the DTC with distances to the front objects.

The processor 141 may obtain the position (distance and direction) and the relative speed of the objects on the sides of the vehicle 1 (front right, front left, rear right, and rear left) based on corner radar data of the plurality of corner radars.

The processor 141 may transmit the steering signal to the steering system 42 based on the position (distance and direction) and the relative speed of side objects of the vehicle 1.

For example, when the collision with the front object is determined based on TTC or DTC, the processor 141 may transmit the steering signal to the steering system 42 to avoid collision with the front object.

The processor 141 may determine whether to avoid the collision with the front object by changing the driving direction of the vehicle 1 based on the position (distance and direction) and relative speed of the side objects of the vehicle 1. For example, when there is no the object located on the side of the vehicle 1, the processor 141 may transmit the steering signal to the steering system 42 to avoid the collision with the front object. When the collision with the side object is not predicted after the steering of the vehicle 1 based on the position (distance and direction) of the side objects and the relative speed, the processor 141 may transmit the steering signal to the steering system 42 to avoid the collision with the front object. When the collision with the side object is predicted after the steering of the vehicle 1 based on the position (distance and direction) of the side objects and the relative speed, the processor 141 may not transmit the steering signal to the steering system 42.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

The DAS 100 is not limited to the components illustrated in FIG. 2, and may further include the LiDAR that scans around the vehicle 1 and detects the object.

Accordingly, the controller 140 may transmit the braking signal to the braking system 32 based on whether the collision with the front object is predicted. When the side object does not exist or the collision with the side object is not predicted, the controller 140 may transmit the steering signal to the steering system 42 to avoid collision with the front object. When the collision with the side object is predicted after steering, the controller 140 may not transmit the steering signal to the steering system 42.

Meanwhile, before describing various embodiments described below, data processed by the controller 140 and a subject of obtaining the data will be described.

The vehicle 1 may include a front image sensor having a front field of view of the vehicle 1 and obtaining front image data, a front non-image sensor that has a front detection field of view of the vehicle 1 and is selected from the group consisting of a radar sensor and a Light Detection and Ranging (LiDAR) sensor, and obtains front detection data, a side non-image sensor that has a side detection field of view of the vehicle 1 and is selected from a group consisting of the radar sensor and the LiDAR sensor to obtain side detection data, a rear image sensor that has a rear field of view of the vehicle 1 and acquires rear image data, and a rear non-image sensor that has a rear detection field of view of the vehicle 1 and is selected from a group consisting of the radar sensor and the LiDAR sensor to obtain rear detection data.

The front image sensor and the front non-image sensor may detect a front object located in front of the vehicle 1.

The side non-image sensor may detect a side object, a front side object, and a rear side object located in the side, front side and rear side of the vehicle 1. The side non-image sensor is provided at a corner position of the vehicle 1 and can detect side objects, anterior objects, and rear objects located in the side, front and rear sides alone, and may be provided on the side of the vehicle 1, together with the front image sensor, the front non-image sensor, the rear image sensor and the rear non-image sensor and detects side objects, anterior and posterior objects located in the anterior and posterior areas.

The rear image sensor and the rear non-image sensor may detect a rear object located at the rear of the vehicle 1.

The present invention is conducted based on the on/off of the turn indicator lamp of the vehicle 1 when an adaptive cruise control (ACC) is activated. For example, when the direction indicator lamp of the vehicle 1 is turned on, the controller 140 may determine that the driver is willing to change lanes, and a control algorithm to be described later may be executed. For example, when the left side of the direction indicator lamp is turned on, the controller 140 predicts that the driver will attempt to change lanes to the left lane, and performs control based on the activation of the non-image sensor on the left. Conversely, when the right side of the direction indicator lamp is turned on, the controller 140 predicts that the driver will attempt to change the lane to the right lane, and performs control based on the activation of the non-image sensor on the right.

Furthermore, the present invention may be applied when performing a left turn simultaneously with another vehicle on an opposite side at an intersection while performing the ACC or a Navigate on Autopilot (NOA).

Figure 4:
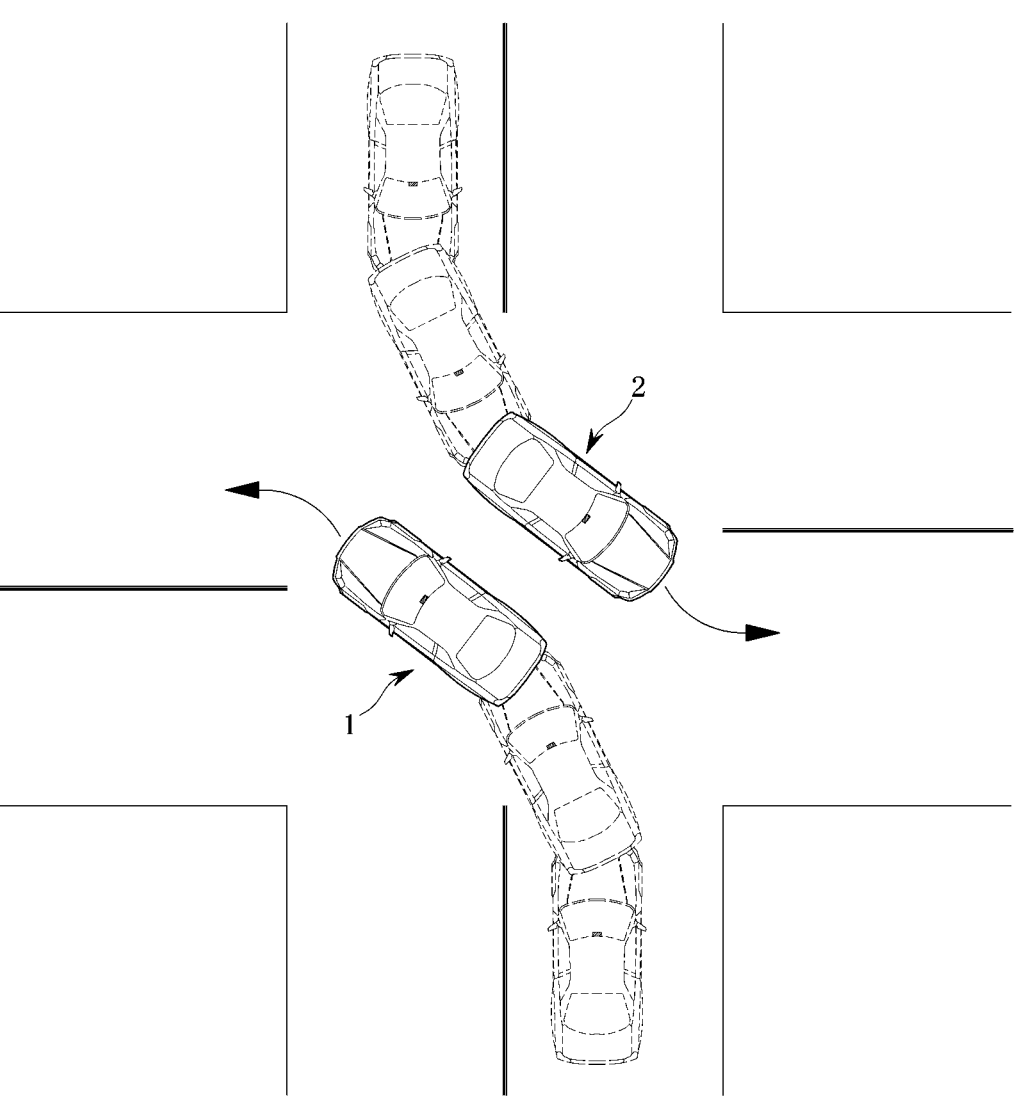
FIG. 4 is a view exemplarily illustrating a situation to which a method of controlling a vehicle is applied according to an exemplary embodiment of the present invention.

Referring to FIG. 4, in general, when the vehicle 1 performs the left turn simultaneously with an object 2 on the opposite side, the avoidance control may be performed based on the position and/or relative speed of the object 2. At the instant time, when the vehicle 1 performs the avoidance control based on the position and/or relative speed of the object 2, the vehicle 1 turning on a left road and the object 2 turning on a right road may perform an emergency braking or an emergency steering even though there is no the possibility of collision, providing anxiety to the driver.

Accordingly, the present invention makes it possible to reserve the avoidance control, which is sensitively performed in a related art, to be reserved by considering additional information other than the position and the relative speed of the object 2. Specific methods for implementing this will be described in detail with reference to FIG. 5, FIG. 6, FIG. 7 and FIG. 8 below.

Figure 5:
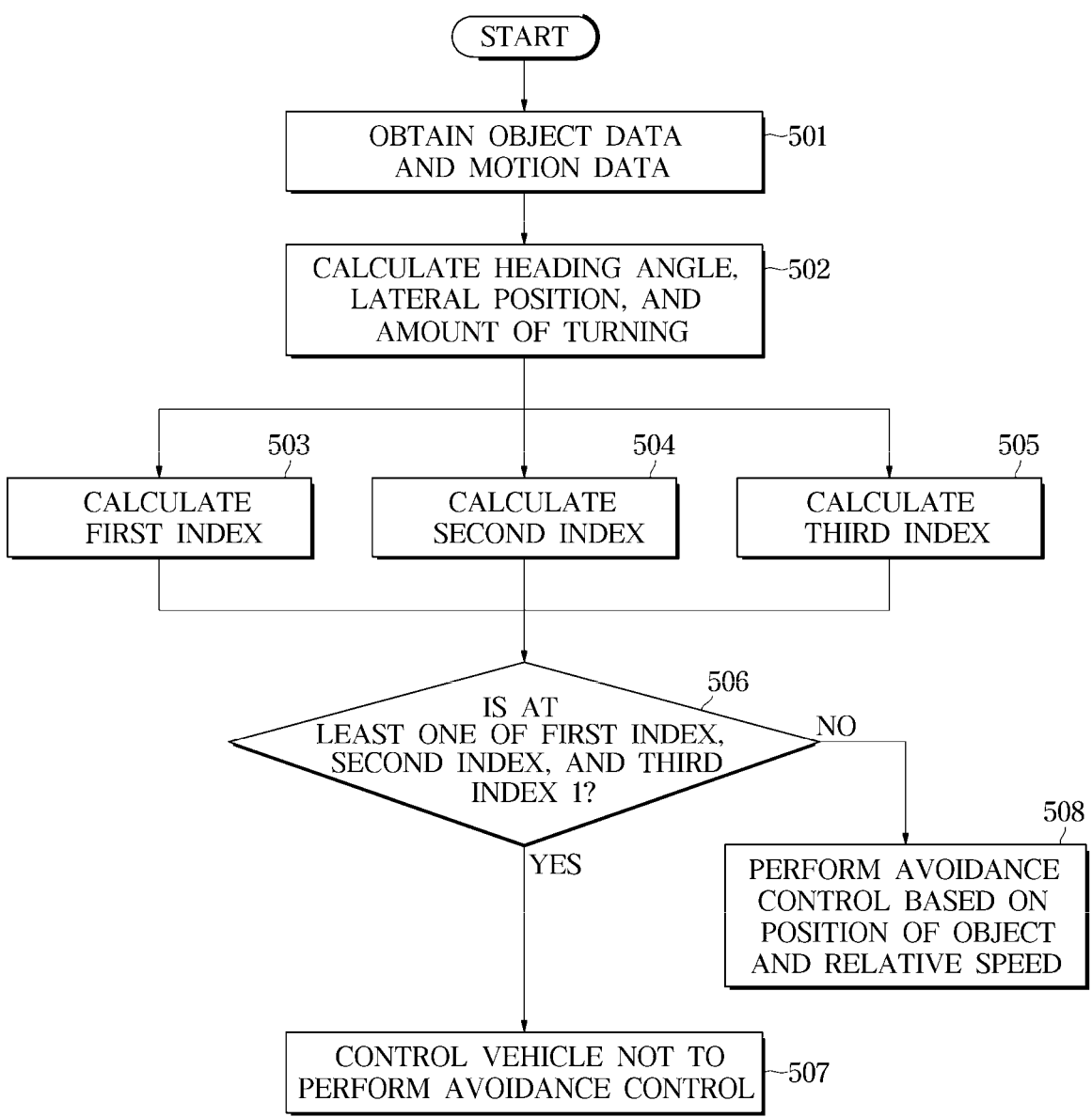
FIG. 5 is a flowchart of a method of controlling a vehicle according to an exemplary embodiment of the present invention.
Figure 6:
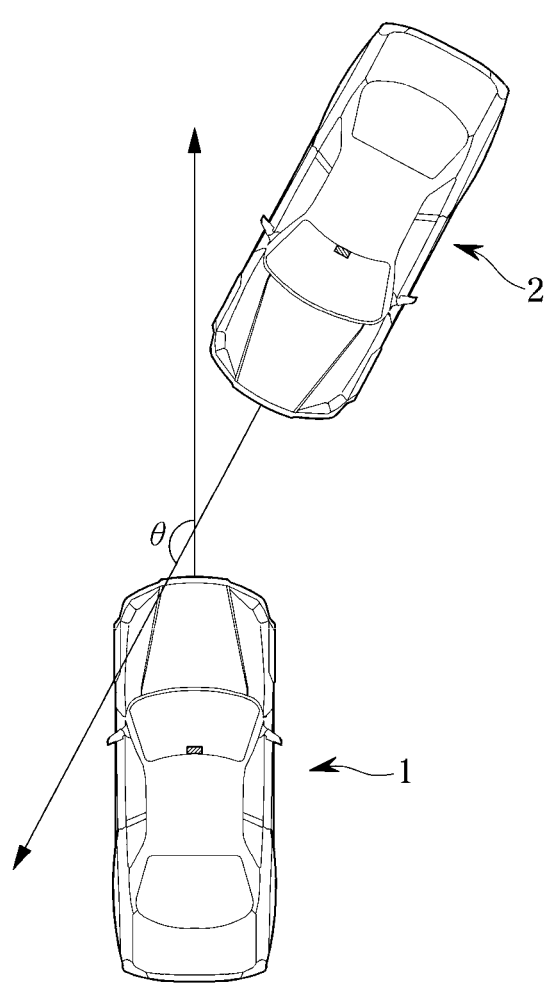
FIG. 6 is a view for describing determination of a first index according to an exemplary embodiment of the present invention.
Figure 7:
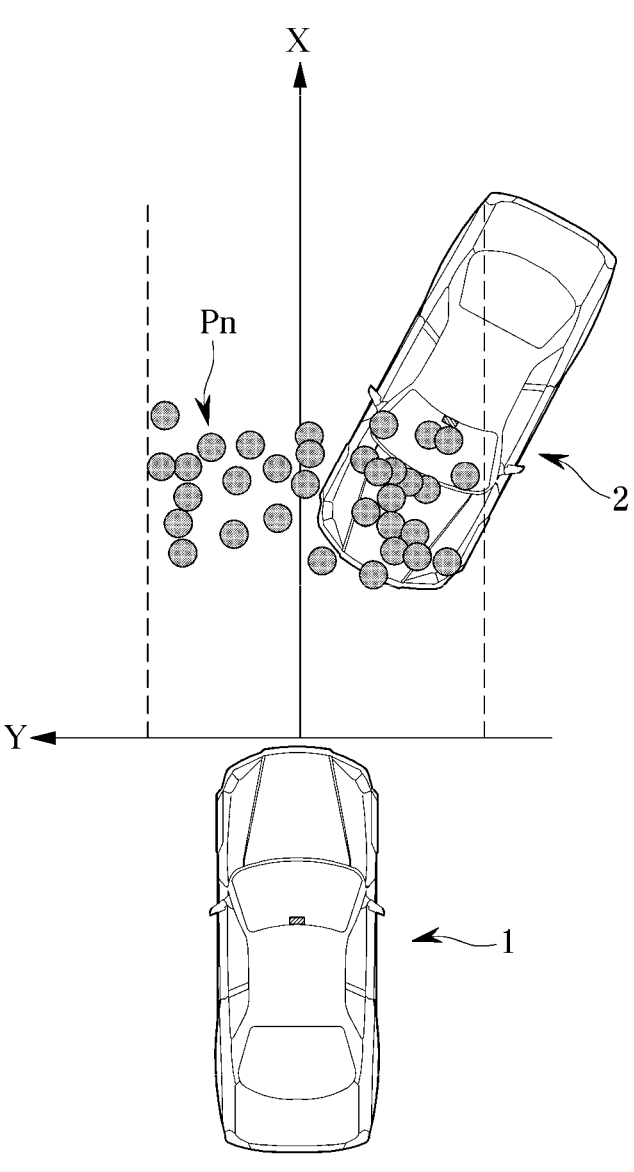
FIG. 7 is a view for describing determination of a second index according to an exemplary embodiment of the present invention.
Figure 8:
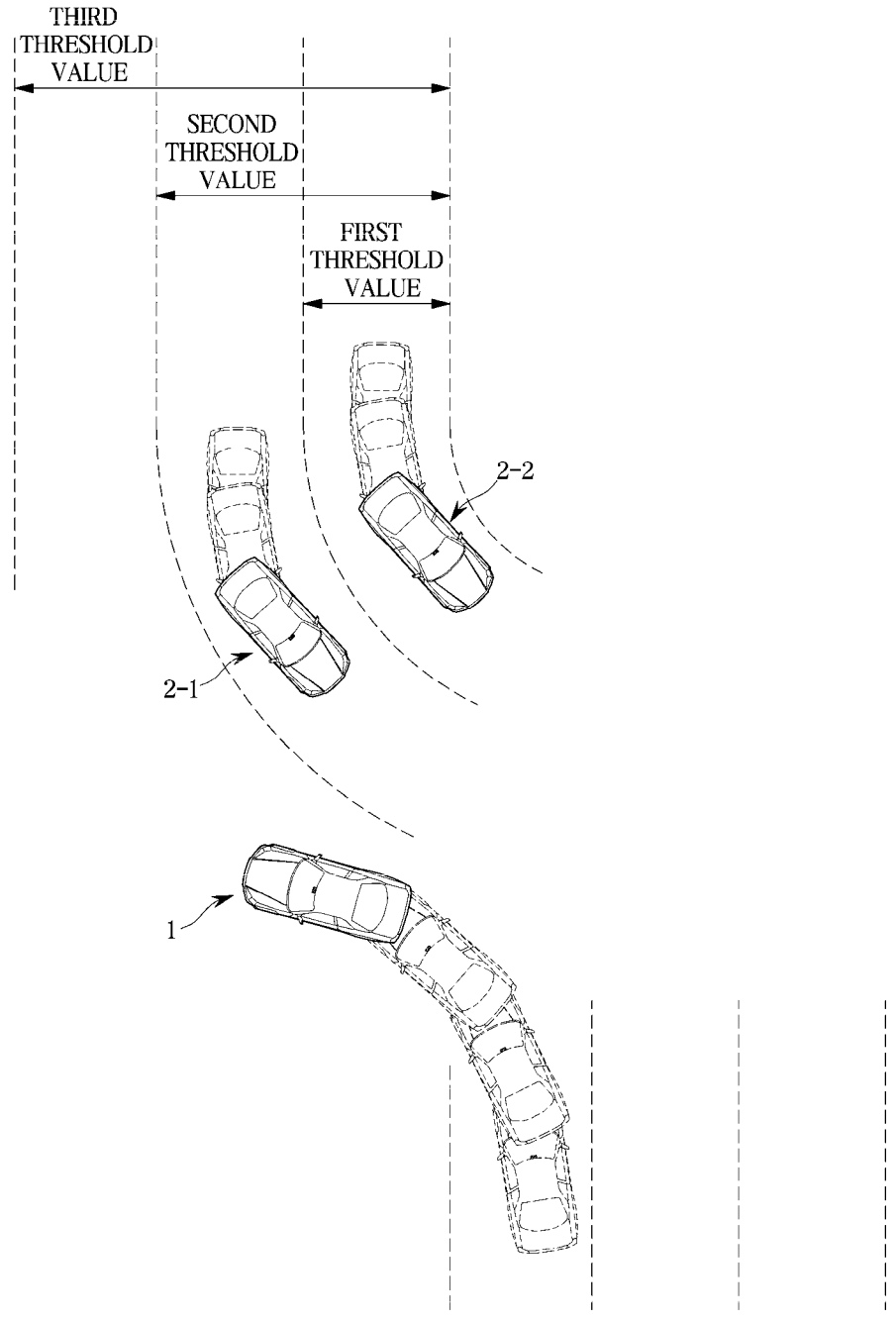
FIG. 8 is a view for describing determination of a third index according to an exemplary embodiment of the present invention.

FIG. 5 is a flowchart of a method of controlling a vehicle according to an exemplary embodiment of the present invention. A method of controlling the vehicle 1 according to FIG. 5 will be described with reference to FIGS. 6 to 8. FIG. 6 is a view for describing determination of a first index according to various exemplary embodiments of the present invention, FIG. 7 is a view for describing determination of a second index according to various exemplary embodiments of the present invention, and FIG. 8 is a view for describing determination of a third index according to an exemplary embodiment of the present invention.

The controller 140 may obtain the object data and motion data (501). The object data may correspond to information related to the object 2 obtained through at least one of the front camera 110, the front radar 120, and the plurality of corner radars, and the motion data may correspond to information related to the vehicle 1 obtained through the dynamics sensor 130.

The controller 140 may determine at least one of a heading angle between the object 2 and the vehicle 1, a lateral position of the object 2 with respect to the vehicle 1, and an amount of turning of the vehicle 1 based on the object data and motion data (502).

The controller 140 may determine a first index based on the heading angle (503). Referring to FIG. 6, a heading angle θ may correspond to an angle between an extension line perpendicular to a front surface of the vehicle 1 and an extension line perpendicular to a front surface of the object 2. The heading angle may be obtained through the sensing device as the object data, and the controller 140 may process the object data to determine the heading angle between vehicle 1 and the object 2.

The first index is a control index using the heading angle as a factor, and may have a value of 0 or 1. When the first index has 1, it may refer to a case where the probability of collision is view of the heading angle despite the position and the relative speed of the object, and 0 may indicate that the possibility of collision cannot be determined or the probability of collision is high.

According to the exemplary embodiment of the present invention, the controller 140 may determine the first index as 1 when the heading angle is equal to or greater than a predetermined first threshold value. In the instant case, the predetermined first threshold value is smaller than 180° but close to 180°, and may indicate a case in which the vehicle 1 and the object 2 are driving side by side in opposite directions. In the instant case, as a case in which the vehicle 1 and the object 2 enter the intersection at the same time, and the controller 140 may control the vehicle 1 so as not to perform the avoidance control because a distance between the vehicle 1 and the object 2 is close but the vehicle 1 is driving in different directions.

Also, according to the exemplary embodiment of the present invention, the controller 140 may determine the first index as 1 when the heading angle is equal to or greater than a value lower than the predetermined first threshold value and the lateral position of the object 2 with respect to the vehicle 1 is equal to or greater than a predetermined distance. In the instant case, the value lower than the predetermined first threshold value may have an angle within an obtuse angle range, and may indicate a case in which there is no the possibility of collision as the vehicle 1 and the object 2 drive by maintaining the predetermined distance. In the instant case, as the vehicle 1 and the object 2 enter the intersection at different times, the controller 140 may control the vehicle 1 so that the collision between the vehicle 1 and the object 2 is somewhat present according to the heading angle, but not avoiding the control by maintaining the predetermined distance.

Furthermore, according to the exemplary embodiment of the present invention, the controller 140 may determine a change amount per time of the heading angle. When the change amount per time of the heading angle is greater than or equal to a predetermined change amount threshold value, the controller 140 may determine the first index corresponding to the change amount of the heading angle per time as 1. When the change amount per time of the heading angle is less than the predetermined change amount threshold value, the controller 140 may determine the first index as 0.

In the instant case, this refers to a case in which the vehicle 1 and the object 2 entered the intersection at different times, but the vehicle 1 and the object 2 finally pass the intersection side by side in opposite directions due to a speed difference between the them. For example, as the object 2 first enters the intersection, the heading angle between the vehicle 1 and the object 2 is about 135°. However, as the vehicle 1 enters the intersection, the heading angle between the vehicle 1 and the object 2 approaches 180°.

Also, the controller 140 may determine a second index based on the lateral position of the object 2 with respect to the vehicle 1 (504). Referring to FIG. 7, the lateral position may indicate a perpendicular distance between the extension line perpendicular to the front of the vehicle 1 and the object 2.

The controller 140 may determine the second index as 1 when the lateral position of the object 2 with respect to the vehicle 1 is greater than or equal to the predetermined distance, and may determine the second index as 0 when the lateral position of the object 2 with respect to the vehicle 1 is less than the predetermined distance. The controller 140 may form a band having a constant width with respect to the vehicle 1. When the object 2 is detected outside the band, the controller 140 may determine the second index corresponding to the lateral position as 1. When the object 2 is detected within the band, the controller 140 may determine the second index as 0.

On the other hand, referring back to FIG. 7, the controller 140 may control the vehicle 1 so as not to perform the avoidance control on the object 2 detected outside the band based on the current position of the vehicle 1 to supplement a prediction judgment in which an error is accumulated.

At the present time, point data in the band may indicate a position in an area where the possibility of collision with the vehicle 1 exists.

$$\min\ Y(p_1,p_2,p_3,\ \dots\ ,p_n) \leq band \leq \max\ Y(p_1,p_2,p_3,\ \dots\ ,pn) \qquad \text{[Equation 1]}$$

(pn: lateral position of the object at a time of control)

Also, the controller 140 may determine a third index based on the amount of turning of the vehicle 1 (505). Referring to FIG. 8, the amount of turning is an amount that the vehicle 1 moves to change a route at the intersection, and may be determined by Equation 2 below.

$$\text{amount of turning} = \qquad \text{[Equation 2]}$$
$$\sum_{n=1}^{n=a}((S = \text{ateering Angle} \times \text{Vehicle Speed} \times Yawrate) \times wU)$$

(a: a number of samplings from a start of the vehicle turning to a straight motion, wU: a U-turn weight)

The amount of turning may be obtained by the dynamics sensor 130 provided in the vehicle 1, and may be determined based on the steering angle of the vehicle 1, the speed of the vehicle 1, and the yaw rate of the vehicle 1. However, the amount of turning at the time of U-turn needs to be corrected by a smaller speed than when the vehicle 1 turns left, and when the vehicle 1 makes the U-turn, the U-turn weight (wU>1) may be applied.

According to the exemplary embodiment of the present invention, the controller 140 may determine the third index as 1 when the amount of turning of the vehicle 1 is equal to or greater than a predetermined threshold value. When the amount of turning of the vehicle 1 is less than the predetermined threshold value, the controller 140 may determine the third index as 0.

In the instant case, the threshold value may have a high value according to a number of lanes adjacent to the object 2 entering the intersection from the opposite side to the vehicle 1. The vehicle 1 may variably set the predetermined threshold value according to the setting. Accordingly, the vehicle 1 may perform the avoidance control and avoidance control prevention by considering a second object 2-2 in addition to an adjacent first object 2-1.

A larger the amount of turning, the more the vehicle 1 deviated from the intersection. Accordingly, the controller 140 may determine the third index as 1 when the amount of turning is greater than or equal to the predetermined threshold value in consideration of the decrease in the possibility of collision of the vehicle 1 with the object 2, and may control the vehicle 1 so as not to perform the avoidance control.

When the first index to the third index are determined in operations 503 to 505, the controller 140 may determine whether at least one of the first index, the second index, and the third index is 1. When at least one of the first index, the second index, and the third index is 1, the controller 140 may control the vehicle 1 not to perform the existing avoidance control by determining that there is no the possibility of collision without considering the distance and/or the relative speed between the vehicle 1 and the object 2 (507).

Conversely, when all of the first index, the second index, and the third index are 0, the controller 140 may perform the avoidance control in consideration of the distance and/or the relative speed between the vehicle 1 and the object 2 as in the related art (508).

According to the exemplary embodiments of the present invention, it is possible to prevent a sensitive control of the collision avoidance assistance and perform the avoidance control only when there is an actual collision possibility, providing an autonomous driving vehicle with a high degree of perfection.

The disclosed exemplary embodiments may be implemented in a form of a recording medium storing computer-executable instructions that are executable by a processor. The instructions may be stored in a form of a program code, and when executed by a processor, the instructions may generate a program module to perform operations of the included exemplary embodiments. The recording medium may be implemented non-transitory as a computer-readable recording medium.

The non-transitory computer-readable recording medium may include all kinds of recording media storing commands which may be interpreted by a computer. For example, the non-transitory computer-readable recording medium may be, for example, ROM, RAM, a magnetic tape, a magnetic disc, flash memory, an optical data storage device, and the like.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle for performing avoidance control of the vehicle according to a position and a relative speed of an object on an opposite side, the vehicle comprising:
  a sensing device mounted to the vehicle and having a field of view in front of the vehicle and a field of view in a lateral side of the vehicle, the sensing device configured to obtain object data related to the object;

a sensor configured to detect a motion of the vehicle and obtain motion data based on the motion of the vehicle; and
  a controller including a processor configured to process the object data and the motion data,
  wherein the controller is configured to:
    determine a heading angle between the object and the vehicle according to the object data and the motion data, a lateral position of the object with respect to the vehicle, and an amount of turning of the vehicle,
    determine an index for each of the heading angle, the lateral position, and the amount of turning by comparing the heading angle, the lateral position, and the amount of turning with respective threshold value of the heading angle, the lateral position, and the amount of turning, and
    not perform the avoidance control of the vehicle when the index for each of the heading angle, the lateral position, and the amount of turning satisfies a predetermined condition,
  wherein the lateral position of the object is calculated from a distance between an extension line extending perpendicular to the front of the vehicle and an extension line extending perpendicularly from the object,
  wherein the controller is configured to form a band having a constant width based on the vehicle, the threshold value of the lateral position comprising the band,
  when the object is detected to be outside the band, determine the index for the lateral position corresponding to the predetermined condition for the lateral position,
  when the object is detected to be within the band, determine the index for the lateral position dissatisfying the predetermined condition for the lateral position,
  wherein the threshold value for the amount of turning increases as a number of lanes around a lane used by the object entering an intersection from the opposite side of the vehicle increases, and
  wherein the amount of turning is determined based on a steering angle of the vehicle, a speed of the vehicle and a yaw rate of the vehicle, and when the vehicle makes a U-turn, the speed is weighted to be greater than a U-turn speed.

2. The vehicle of claim 1,
  wherein the index for each of the heading angle, the lateral position, and the amount of turning includes a first index, a second index and a third index, and
  wherein the controller is configured to:
    when the heading angle is greater than or equal to a predetermined first threshold value, determine the first index corresponding to the heading angle as 1,
    when the heading angle is less than the predetermined first threshold value, determine the first index as 0,
    when the lateral position is greater than or equal to a predetermined second threshold value, determine the second index corresponding to the lateral position as 1,
    when the lateral position is less than the predetermined second threshold value, determine the second index as 0,
    when the amount of turning is greater than or equal to a predetermined third threshold value, determine the third index corresponding to the amount of turning as 1, and
    when the amount of turning is less than the predetermined third threshold value, determine the third index as 0.

3. The vehicle of claim 2, wherein, when at least one of the first index, the second index, and the third index has a value of 1, the controller is configured not to perform the avoidance control.

4. The vehicle of claim 1, wherein the index for each of the heading angle, the lateral position, and the amount of turning includes a first index, and wherein the controller is configured to:

determine a change amount per time of the heading angle, when the change amount per time of the heading angle is greater than or equal to a predetermined change amount threshold value, determine the first index corresponding to the change amount per time of the heading angle as 1, and when the change amount per time of the heading angle is less than the predetermined change amount threshold value, determine the first index as 0.

5. The vehicle of claim 1, wherein the heading angle is an angle between an extension line perpendicular to a front surface of the vehicle and an extension line perpendicular to a front surface of the object.

6. The vehicle of claim 1, wherein the index for each of the heading angle, and the amount of turning includes a second index, and wherein the controller is configured to:

form the band having a constant width based on the vehicle, when the object is detected to be outside the band, determine the second index corresponding to the lateral position as 1, and when the object is detected to be within the band, determine the second index as 0.

7. The vehicle of claim 1, wherein the controller is further configured to determine the amount of turning according to an angular velocity of the vehicle.

8. A method of controlling a vehicle, the vehicle for performing avoidance control of the vehicle according to a position and a relative speed of an object on an opposite side, the method comprising:

obtaining, by sensors, object data related to the object and motion data related to motion of the vehicle;

determining, by a controller, a heading angle between the object and the vehicle according to the object data and the motion data, a lateral position of the object with respect to the vehicle, and an amount of turning of the vehicle;

determining, by the controller, an index for each of the heading angle, the lateral position, and the amount of turning by comparing the heading angle, the lateral position, and the amount of turning with respective threshold value of the heading angle, the lateral position, and the amount of turning; and controlling, by the controller, the vehicle not to perform the avoidance control of the vehicle when the index for each of the heading angle, the lateral position, and the amount of turning satisfies a predetermined condition, wherein the lateral position of the object is calculated from a distance between an extension line extending perpendicular to the front of the vehicle and an extension line extending perpendicularly from the object, wherein the determining the index comprises forming a band having a constant width based on the vehicle, the threshold value of the lateral position comprising the band, when the object is detected to be outside the band, determining the index for the lateral position corresponding to the predetermined condition for the lateral position, when the object is detected to be within the band, determining the index for the lateral position dissatisfying the predetermined condition for the lateral position, wherein the threshold value for the amount of turning increases as a number of lanes around a lane used by the object entering an intersection from the opposite side of the vehicle increases, and wherein the amount of turning is determined based on a steering angle of the vehicle, a speed of the vehicle and a yaw rate of the vehicle, and when the vehicle makes a U-turn, the speed is weighted to be greater than a U-turn speed.

9. The method of claim 8, wherein the index for each of the heading angle, the lateral position, and the amount of turning includes a first index, a second index and a third index, and wherein the determining includes:

when the heading angle is greater than or equal to a predetermined first threshold value, determining the first index corresponding to the heading angle as 1;

when the heading angle is less than the predetermined first threshold value, determining the first index as 0;

when the lateral position is greater than or equal to a predetermined second threshold value, determining the second index corresponding to the lateral position as 1;

when the lateral position is less than the predetermined second threshold value, determining the second index as 0;

when the amount of turning is greater than or equal to a predetermined third threshold value, determining the third index corresponding to the amount of turning as 1; and when the amount of turning is less than the predetermined third threshold value, determining the third index as 0.

10. The method of claim 9, wherein the controlling of the vehicle includes:

when at least one of the first index, the second index, and the third index has a value of 1, controlling the vehicle not to perform the avoidance control.

11. The method of claim 8, wherein the index for each of the heading angle, the lateral position, and the amount of turning includes a first index, and wherein the determining includes:

determining a change amount per time of the heading angle;

when the change amount per time of the heading angle is greater than or equal to a predetermined change amount threshold value, determining the first index corresponding to the change amount per time of the heading angle as 1; and when the change amount per time of the heading angle is less than the predetermined change amount threshold value, determining the first index as 0.

12. The method of claim 8, wherein the heading angle is an angle between an extension line perpendicular to a front surface of the vehicle and an extension line perpendicular to a front surface of the object.

13. The method of claim 8, wherein the index for each of the heading angle, and the amount of turning includes a second index, and wherein the determining includes:

forming the band having a constant width based on the vehicle;

when the object is detected to be outside the band, determining the second index corresponding to the lateral position as 1; and when the object is detected to be within the band, determining the second index as 0.

14. The method of claim 8, wherein the controller is further configured to determine the amount of turning according to an angular speed of the vehicle.

15. A non-transitory computer readable medium including program instructions executed by the processor to perform the method of claim 8.

16. A non-transitory computer readable medium including program instructions executed by a processor, the computer readable medium including:

program instructions that obtain, by sensors, object data related to an object on an opposite side and motion data related to motion of a vehicle;

program instructions that determine, by a controller, a heading angle between the object and the vehicle according to the object data and the motion data, a lateral position of the object with respect to the vehicle, and an amount of turning of the vehicle;

program instructions that determine, by the controller, an index for each of the heading angle, the lateral position, and the amount of turning by comparing the heading angle, the lateral position, and the amount of turning with respective threshold value of the heading angle, the lateral position, and the amount of turning; and program instructions that control, by the controller, the vehicle not to perform an avoidance control of the vehicle when the index for each of the heading angle, the lateral position, and the amount of turning satisfies a predetermined condition, wherein the lateral position of the object is calculated from a distance between an extension line extending perpendicular to the front of the vehicle and an extension line extending perpendicularly from the object, wherein the determining the index comprises forming a band having a constant width based on the vehicle, the threshold value of the lateral position comprising the band, when the object is detected to be outside the band, determining the index for the lateral position corresponding to the predetermined condition for the lateral position, when the object is detected to be within the band, determining the index for the lateral position dissatisfying the predetermined condition for the lateral position, wherein the threshold value for the amount of turning increases as a number of lanes around a lane used by the object entering an intersection from the opposite side of the vehicle increases, and wherein the amount of turning is determined based on a steering angle of the vehicle, a speed of the vehicle and a yaw rate of the vehicle, and when the vehicle makes a U-turn, the speed is weighted to be greater than a U-turn speed.

17. The non-transitory computer readable medium of claim 16, wherein the index for each of the heading angle, the lateral position, and the amount of turning includes a first index, a second index and a third index, and wherein the determining includes:

when the heading angle is greater than or equal to a predetermined first threshold value, determining the first index corresponding to the heading angle as 1;

when the heading angle is less than the predetermined first threshold value, determining the first index as 0;

when the lateral position is greater than or equal to a predetermined second threshold value, determining the second index corresponding to the lateral position as 1;

when the lateral position is less than the predetermined second threshold value, determining the second index as 0;

when the amount of turning is greater than or equal to a predetermined third threshold value, determining the third index corresponding to the amount of turning as 1; and when the amount of turning is less than the predetermined third threshold value, determining the third index as 0.

18. The non-transitory computer readable medium of claim 17, wherein the controlling of the vehicle includes:

when at least one of the first index, the second index, and the third index has a value of 1, controlling the vehicle not to perform the avoidance control.

19. The non-transitory computer readable medium of claim 16, wherein the index for each of the heading angle, the lateral position, and the amount of turning includes a first index, and wherein the determining includes:

determining a change amount per time of the heading angle;

when the change amount per time of the heading angle is greater than or equal to a predetermined change amount threshold value, determining the first index corresponding to the change amount per time of the heading angle as 1; and when the change amount per time of the heading angle is less than the predetermined change amount threshold value, determining the first index as 0.

20. The non-transitory computer readable medium of claim 16, wherein the heading angle is an angle between an extension line perpendicular to a front surface of the vehicle and an extension line perpendicular to a front surface of the object.

* * * * *